United States Patent [19]

Nel

[11] 4,126,465
[45] Nov. 21, 1978

[54] FILM PACK WITH MEANS FOR URGING POSITIVE AND NEGATIVE SHEETS TOGETHER

[75] Inventor: Pierre E. Nel, Lynnfield, Mass.

[73] Assignee: Polaroid Corporation, Cambridge, Mass.

[21] Appl. No.: 523,038

[22] Filed: Nov. 12, 1974

[51] Int. Cl.² .......... G03C 1/48; G03B 19/10; G03D 9/02
[52] U.S. Cl. .................. 96/76 C; 96/201; 96/76 C; 354/178; 354/179; 354/304
[58] Field of Search .......... 96/76 R, 76 C, 201; 354/179, 301, 303, 304, 178

[56] References Cited
U.S. PATENT DOCUMENTS
3,479,184  11/1969  Land et al. .......... 96/76 C Primary Examiner—Richard L. Schilling
Attorney, Agent, or Firm—Philip G. Kiely; Mart C. Matthews

[57] ABSTRACT

Means are provided in a photographic film pack for urging the superposed sheet elements of a diffusion transfer film unit together during the withdrawal of said film unit from its container. Said means are useful for eliminating white specks in the resultant positive transfer print.

4 Claims, 6 Drawing Figures

FILM PACK WITH MEANS FOR URGING POSITIVE AND NEGATIVE SHEETS TOGETHER

BACKGROUND OF THE INVENTION

1. Field of the Invention

This invention relates to photographic products and, more particularly, to novel photographic film packs.

2. Description of the Prior Art

Photographic film packs or magazines adapted to house and dispense a plurality of diffusion transfer film units in stack rather than roll form are conventional and well known in the photographic art. See, for example, U.S. Pat. Nos. 3,080,805; 3,479,184; and other patents assigned to the present assignee.

One familiar film package of the type described takes the form of a generally flat, elongated container having an exposure opening in a forward wall through which light from the scene being photographed can be focused, and an exit opening in one transverse end through which a film unit can be withdrawn from the container subsequent to exposure for processing by the camera. Each film unit includes a negative and a positive element in the form of a pair of sheets, each of which has an appropriate photographic coating on one surface, e.g., a photosensitive coating and an image-receiving coating, respectively. The format is such that the sheets are stacked in superposed relationship with the coatings of each sheet facing in the direction of the exposure opening. A pressure plate is disposed between the stacks to urge the negative sheet into a plane that coincides with the focal plane of the camera into which the film package is inserted. Web means interconnect the sheets and are cooperable with the pressure plate so that the negative sheet can be longitudinally moved, after exposure, relative to the container until the negative sheet is positioned in registration and in superposition with the positive sheet, with the coated surface of each facing the other. In this condition, the sheets are in what is termed superposed face-to-face registration and the introduction of processing liquid between the sheets effects photographic development and the transfer of the image from one sheet to the other. Such introduction takes place when both sheets are longitudinally moved while in said superposed face-to-face registration through the exit opening of the container and between a pair of pressure-applying members such as juxtaposed rollers or platens mounted on the camera. The construction is such that initial movement of the sheets as a unit fractures a pod of the processing liquid attached to the film unit, and the liquid is spread between the sheets upon withdrawal of the film unit from the camera. The diffusion transfer process then takes place outside of the camera. To facilitate removal of the unit from the film package, the exit opening of the container is made large enough to effect free longitudinal movement of the positive and negative into and through the exit opening.

One problem encountered with film packs of the aforementioned type is that one may from time to time obtain varying amounts of a defect known as "white specks" across the picture area of the transfer print, which may detract from the quality of the photographic reproduction. This objectionable defect normally takes the form of minute white spots throughout the picture area.

It is the primary object of the present invention to provide an improved film pack of the type just described which does not suffer or suffers to a considerably lesser degree from the above-mentioned defect. That is to say, the present invention provides specific means for eliminating, or substantially reducing to an acceptable level, the number and severity of white specks in a picture obtained from such film packs.

BRIEF SUMMARY OF THE INVENTION

In accordance with the present invention, means are provided whereby the negative and positive sheet elements of the above-described diffusion transfer film pack are urged together while in superposed face-to-face registration during the withdrawal of the film unit from its container. Although said means may be positioned in either the film pack or the camera, a preferred embodiment comprises a resilient or compliant member disposed in the film pack adjacent the exit opening through which the film unit passes during processing, preferably cooperating with the positive holder of the film pack to compress the elements together as they pass through the exit opening. A variety of appropriately dimensioned resilient members positioned within the film pack are contemplated as serving the above-described urging function, and a preferred member comprises a wedge-shaped pad of plastic foam mounted on the rear surface of the pressure plate in position to engage the leading portion of the film unit as it is withdrawn from the exit opening.

DESCRIPTION OF THE PREFERRED EMBODIMENT

Figure 1:
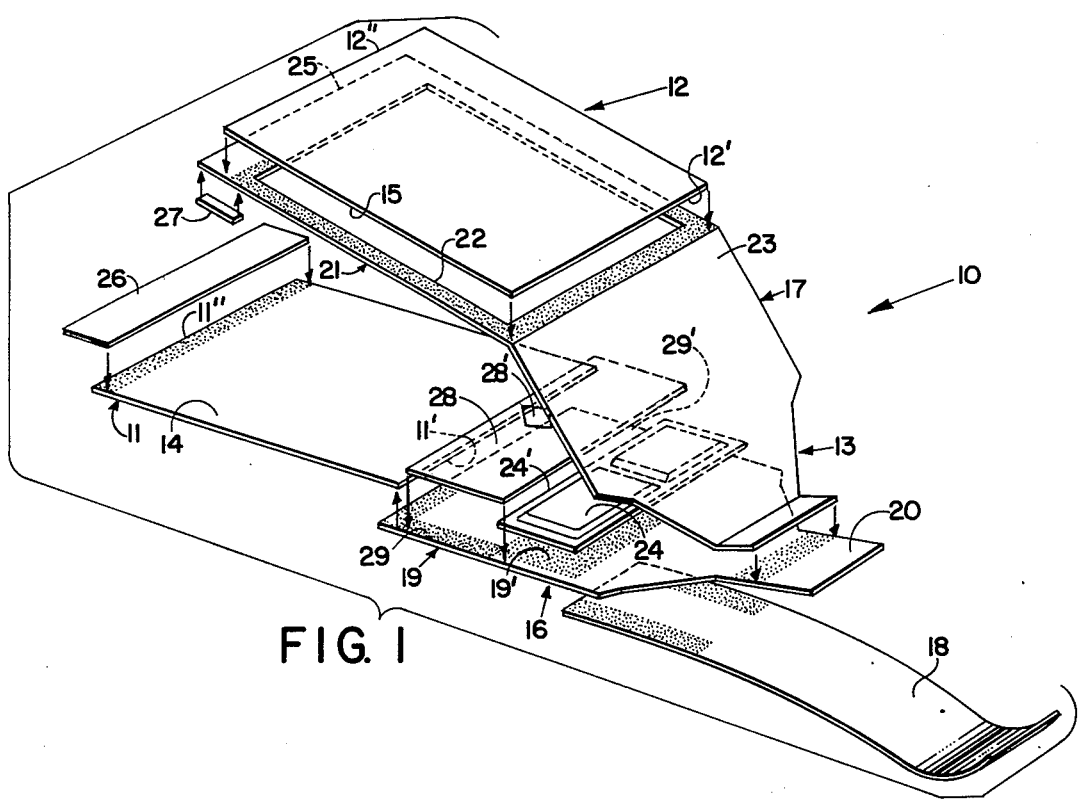
FIG. 1 is an exploded perspective view of a film unit employed in a film pack of the invention.

The present invention essentially involves the recognition that white specks in the picture area may be eliminated or substantially reduced by urging the negative and positive sheet elements of the above-described diffusion transfer film units together, particularly at the region immediately trailing the pod of processing liquid adjacent the rupturable seal thereof and leading to the picture area, i.e., the "bib" region, just before and preferably during the introduction of processing liquid between the superposed sheet elements.

Although not intending to be bound by theory, it is believed that air bubbles entrapped in the processing liquid during the rupture of the pod, and during the initial turbulent flow of the liquid through the bid region, are the primary source of white specks, albeit not the only source thereof. The air bubbles thus entrapped in the viscous processing liquid may cause voids in the transfer of the image-providing materials which appear as white specks in the resultant photographic print. Maintaining a narrower gap between the positive and negative elements by suitable constraining or compression means in accordance with this invention just prior to and during pod rupture may thus reduce the volume of air entrapped and reduce the turbulence of flow. Since the relatively high viscosity of the processing composition is reduced by shear, a moderately fast withdrawal speed and constraint in the picture area of the film unit according to the invention during distribution of the processing composition between the elements may also tend to sweep any air bubbles formed away from the picture area and into the trap area of the film unit.

Accordingly, it can be seen that the essence of the present invention is the urging together of the negative and positive elements of the film unit, however provided, such that these elements are maintained in close relationship, if not intimate contact, with one another as the film unit is withdrawn from the container into the bite of the processing members of the camera.

As previously indicated, the preferred form of film pack contains a plurality of film units in stacked relationship in a container which allows the film units to be sequentially exposed and withdrawn. The photosensitive or negative sheets are stacked together within the container on one side of a pressure plate which urges the coated surface of the outermost negative sheet into the focal plane of the camera, whereas the nonphotosensitive image-receiving or positive sheets are stacked on the opposite side of the pressure plate with their coated surfaces facing the exposure aperture and with their leading edges adjacent the exit opening through which the film units are withdrawn following the exposure of the negative element of each film unit. Web means interconnect the positive and negative sheets and are wrapped around one transverse end of the pressure plate such that the photosensitive element can be moved, by manually drawing a leader of the film unit, to a position which is intermediate its associated positive element and the pressure plate. In such a position, the coated surfaces of the positive and negative elements are in superposed face-to-face registration.

A positive holder comprising a block of frictional material is preferably mounted on and extends through an opening in the rear wall of the container (i.e., the wall opposite the exposure opening), which block is resiliently urged forward against the back surface of the positive element by apparatus in the camera so as to retard longitudinal movement of the positive into and through the exit opening before the negative reaches the above-described position of registration. Such a positive holder is described in detail in U.S. Pat. No. 3,479,184. The film unit once in superposed face-to-face registration is then withdrawn as a unit from the container through the exit opening into the bite of the processing members of the camera.

In accordance with a preferred embodiment of this invention, a resilient member, e.g., a wedge-shaped foam pressure pad, is provided on the back side of the pressure plate intermediate the pressure plate surface and the stack of positives. In this position, the resilient member urges the stack of positives in a backward direction (i.e., away from the exposure opening), and can cooperate with the forwardly urged positive holder on the backward wall of the container so as to apply light compressive force to the leading portions of the positive and negative elements when the negative element has been moved into its registered position intermediate the resilient member and the positive element. This light compressive force acts to maintain the faces of the superposed sheet elements in close relationship or contact when the film unit passes between them on its way through the exit opening. When reference is herein made to "light" compressive force, it is intended to designate a force which is sufficient to firmly press the elements of the film unit together for the purposes previously set forth, but insufficient to rupture the pod of processing liquid or interfere with the proper functioning and removal of the film unit from the container during processing.

The following more specific description is directed to one preferred means of providing this light compressive force in a particular film pack employing film units conventional to the art.

Referring now to FIG. 1, a film unit is shown in perspective in order to better illustrate the component parts and the manner in which the latter are interconnected. Basically, the film unit designated by reference numeral 10 includes negative 11, positive 12 and web means 13 interconnecting the two. Negative 11 has photosensitive coating 14 on one surface and positive 12 has image-receiving coating 15, both coatings being termed photographic coatings for convenience. Web means 13 includes negative leader 16, positive leader 17 and pull tab 18. Negative leader 16 includes pod holder portion 19 attached to the leading edge 11' of negative 11, and pull portion 20 attached at the end of the leader 16 remote from the end to which the negative is attached. The width of pull portion 20 is somewhat reduced to facilitate its threading between the bite of the pressure rollers as will be explained later.

Positive leader 17 includes mask portion 21 provided with rectangular aperture 22 attached to the coated surface 15 of positive 12 for defining the picture area of the positive. In addition, leader 17 includes connector portion 23 by which the leading edge 12' of the positive is connected to the surface of pull portion 20 of the negative leader that faces in the same direction as the coated surface of the negative. As a consequence, connector portion 23 of the positive leader can be superposed over pod holder portion 19 of the negative leader to permit the coated surfaces of the positive and negative to face each other. The lengths of portions 19 and 23 are such that the positive and negative are in superposed face-to-face registration, which is to say that the latent image on the negative can be transferred to the positive completely filling the area defined by opening 22.

The remaining part of web means 13 is pull tab 18 which is releasably attached to the surface of negative leader 16 that faces in the opposite direction to the coating 14 on negative 11. Rupturable pod 24 containing the processing liquid for effecting the diffusion transfer process is mounted on negative leader 16 at leading section 19' of portion 19, said pod having a rupturable marginal seal along transverse edge 24' directed toward leading edge 11' of negative 11. Bib sheet 28 is secured to negative leader 16 at lateral edges 29 and 29', center portion 28' and to the transverse edge 24' of pod 24, which bib facilitates the controlled unidirectional flow of the processing liquid contents upon compressive rupture of pod 24.

The remaining parts of the film unit include a skirt on extension 25 to mask 21 attached to the trailing edge 12" of the positive, and extension 26 attached to the trailing edge 11" of the negative. In cooperation with rails 27 attached to extension 25 and facing in the same direction as the coating on the positive, the extensions 25 and 26 serve as a reservoir to capture and retain excess processing liquid that would otherwise be extruded at the trailing edge of the film unit as the latter is withdrawn from the camera.

Figure 2:
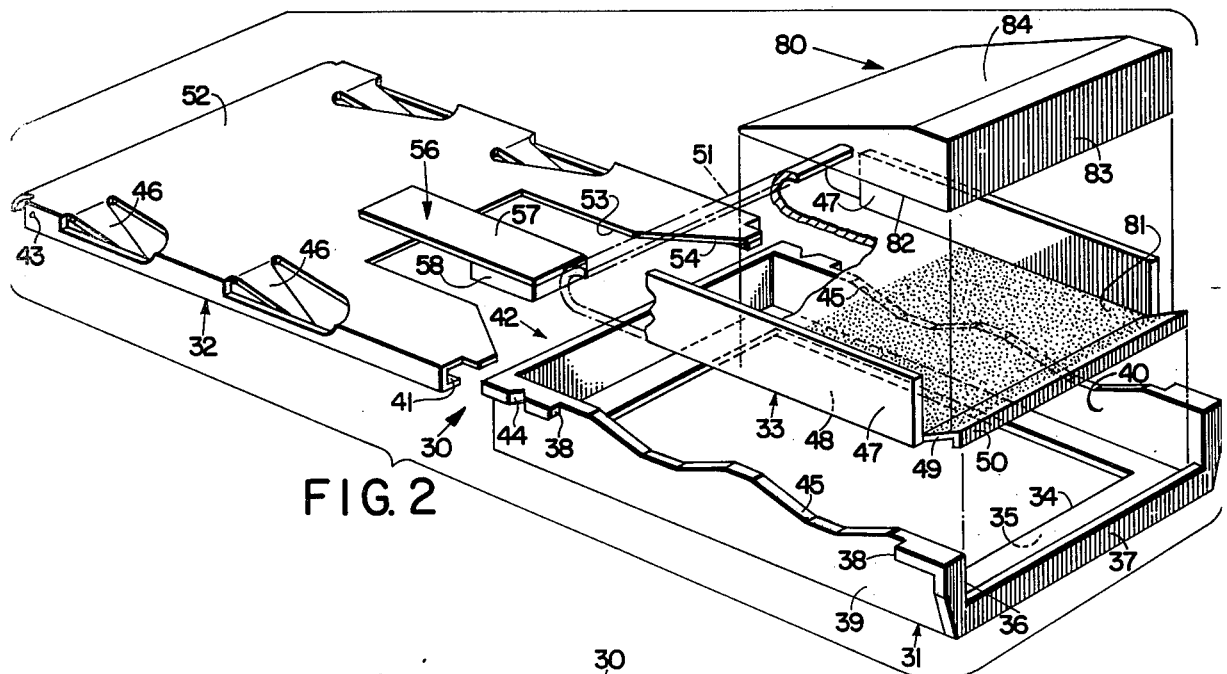
FIG. 2 is an exploded perspective view showing the various elements of a container wherein such film unit may be disposed in the practice of the invention.
Figure 3:
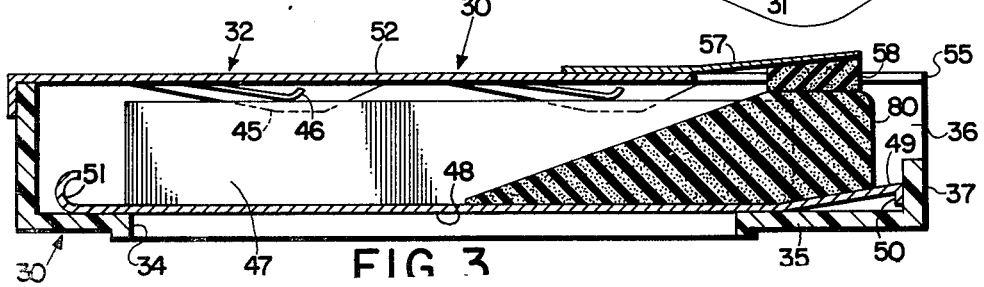
FIG. 3 is a sectional side view of the assembled container shown in FIG. 2.

The positioning of the film unit in the film container designated by reference numeral 30 and shown in exploded perspective in FIG. 2, and in section in FIG. 3, can best be understood by first considering the construction of the container. It should be understood that when reference is made to "forward" or "backward", "front" or "rear", or words of similar import when describing the relationship of the various components of the film unit and container, said components are so designated according to their positions relative to the order in which exposing light would strike them, e.g., the wall closest to the lens when the container is inserted in the camera (the wall struck first) is referred to as the forward wall.

Container 30 includes main housing 31, back 32 and pressure plate 33, and is essentially a generally flat elongated body having an exposure opening therein in the form of opening 34 in forward wall 35 through which light from the scene being photographed can be focused; and an exit opening in the form of opening 36 in transverse end wall 37 through which a film unit can be withdrawn from the container subsequent to exposure for processing. Housing 31 defines forward wall 35 and transverse wall 37 of the container. Lugs 38 on the upstanding longitudinal walls 39 and 40 are cooperable with inturned flanges 41 on back 32 such that the latter can be slid longitudinally onto the housing in the direction of arrow 42 (FIG. 2) to define back wall 52 of the container opposite to forward wall 35. Detent 43 in back 32 is engageable with recess 44 in one of the lugs 38 to securely retain the back on the housing.

The longitudinal wall 52 of the container defined by back 32 is provided, at the end adjacent wall 37, with a relieved portion defined by rectangular cut-out 53 that merges with trapezoidal cut-out 54 at the transverse edge 55 of the back wall adjacent exit opening 36. Openings 53 and 54 are provided for clearance needed by auxiliary apparatus (not shown in FIGS. 2 or 3) attached to the camera for the purpose of engaging the positive sheet of the film unit as the latter is drawn between the bite of the pressure rollers and controlling the transverse flow of the processing liquid between the sheets of the film unit. Such auxiliary apparatus is shown in more detail in U.S. Pat. Nos. 3,165,039 and 3,241,468. A positive holder 56 is provided in the form of a deformable member 57 suitably attached to wall 52 and centered in opening 53, projecting thereinto, but terminating short of edge 55. At the free end of member 57 remote from the end attached to wall 52 is a block of frictional material 58 suitably attached to the surface of member 57 and facing wall 35. Material 58 is ideally one that exerts a substantial frictional force under the light normal loads produced by the forward urging of the auxiliary apparatus on the positive holder. This material is preferably polyurethane foam.

Sides 39 and 40 of the housing are provided with spring receiving notches 45 into which spring tabs 46 punched from back 32 extend when the latter is locked in position. Tabs 46 have considerable width and project into the interior of the housing and into engagement with the top edge of upstanding longitudinal walls 47 of pressure plate 33 which are positioned adjacent to walls 39 and 40 of the housing when the plate is inserted thereinto. Spring tabs 46 urge negative engaging face 48 of the plate toward wall 35 as shown in FIG. 3. At one end of face 48 is extension 49 projecting at an inclination to the plane of face 48 and terminating in a downturned flange 50 adjacent wall 37 when the plate is inserted in the housing. At the other end of face 48 is a rounded guide 51. The assembled container shown in FIG. 3 contains no film units, however, and face 48 rests against wall 35 urged there by springs 46. Guide 51 is slightly spaced from the transverse wall opposite to wall 37 to allow space for the film unit when the latter is inserted into the container.

The preceding description has basically outlined a conventional film unit and a film pack housing same. In accordance with this embodiment of the present invention, a resilient member 80 is mounted on portion 81 on the rear of face 48 of pressure plate 33 for the purpose of providing backward pressure on the superposed and registered negative element which cooperates with the forward pressure on the positive element, provided by positive holder 56 as the result of being urged by said auxiliary camera apparatus, to compress the superposed elements of the film unit as it passes therebetween in its path through opening 36. The resilient member 80 is shown in FIGS. 2 and 3 as being formed from a wedge-shaped pressure pad of resilient material such as plastic foam, and includes a generally rectangular base section 82 having the dimensions of portion 81 of face 48, an upstanding end section 83 extending from the transverse edge of base section 82 adjacent extension 49 to approximately the height of walls 39 and 40 of the housing when pressure plate 33 is inserted therein, and incline portion 84 extending obliquely from the transverse edge of base 82 remote from extension 49 to the edge of end portion 83 adjacent opening 36. Incline portion 84 is preferably provided with a low friction surface to facilitate the longitudinal passage of the negative element and the film unit thereover.

Figure 4:
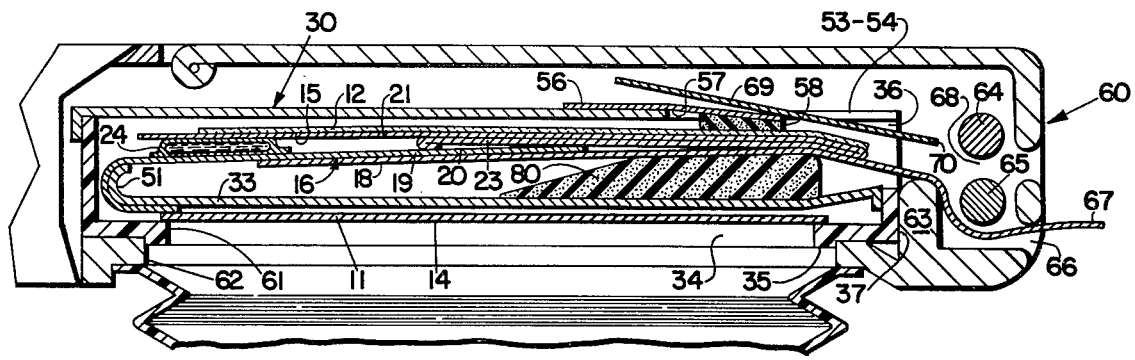
FIGS. 4–6 are sectional side views of a film pack of the invention inserted in a camera and showing the relative positions of the film unit as it is withdrawn from the container and camera in accordance with the invention.
Figure 5:
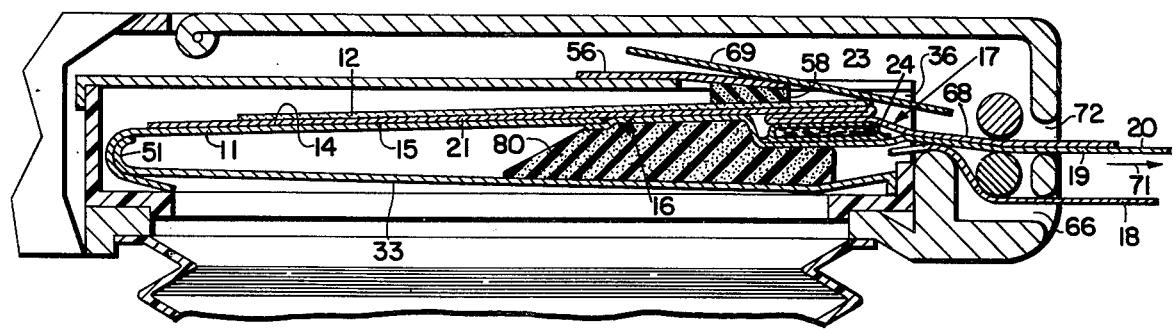
Figure 6:
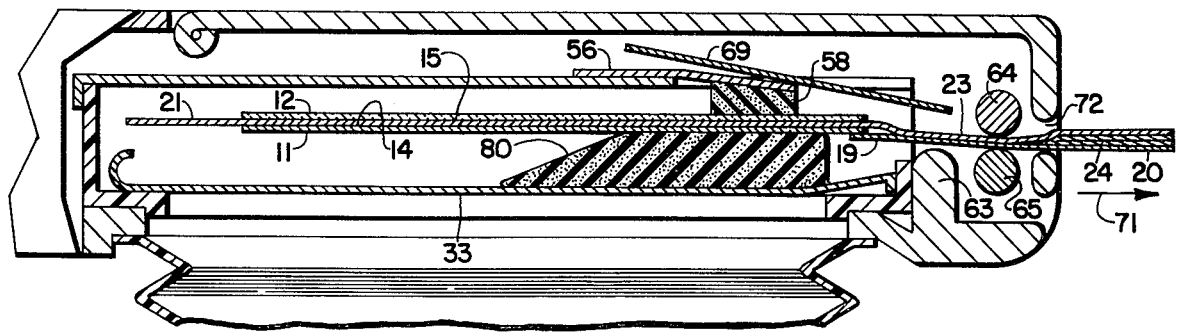

To further understand the results achieved by the use of resilient member 80, reference is now made to FIGS. 4 through 6 which show the sequence of events involved in the operation of the film pack just described. In FIG. 4, container 30 has been inserted into a camera of the type previously described and designated by numeral 60 so that the inner surface of wall 35 is coplanar with the focal plane of the camera. Upstanding lips 61 defining opening 34 cooperate with opening 62 in the camera to correctly align the container relative to the optical axis of the camera. A single film unit like that shown at 10 in FIG. 1 is shown inserted in the container, it being understood that the drawing is limited to a single unit to facilitate illustration of the operation of the device, although in practice the container may have a plurality of film units therein. The format is such that the coating on surface 14 of negative 11 faces in the same direction as the coating on surface 15 of positive 12, and the negative and positive are in stacked relationship. Pressure plate 33 is between the negative and the positive and the plate urges the photosensitive coating 14 into the focal plane of the camera independently of exerting any bias on the positive. Web means interconnects the negative with the positive, and portion 23 of the positive leader is folded back under portion 21 thereof and extends longitudinally from the leading edge of the positive toward the trailing edge thereof. Resilient member 80 supports and resiliently urges folded portion 23 and the leading edge of positive 12 toward the block of frictional material 58 attached to deformable member 57 of positive holder 56. Spring loaded member 69 of the auxiliary apparatus referred to above as controlling the transverse spreading of the processing liquid in turn urges the block of frictional material 58 toward resilient member 80, cooperating therewith to compress the positive at this stage of the operation.

Portion 19 of negative leader 16, connected to the remote end of portion 23, extends longitudinally toward the transverse wall on container 30 that is opposite wall 37, curving 180° around guide 51. Portion 20 of leader 16 extends toward the opening 36. Pull tab 18 extends through opening 36 and over guide 63 on the camera that is adjacent wall 37 and serves to narrow slightly the exit opening through which the film units are withdrawn. Tab 18 continues to one side of the pressure rollers 64 and 64 and through tab opening 66 in the transverse end of the camera. Free end 67 of tab 18 is thus outside the camera and can be grasped and pulled by an operator to achieve the first step in removing the film as shall be explained later.

It should be noted that the backward pressure imparted by resilient member 80 is insufficient to move the film unit significantly out of the plane passing through the opening 36 as defined by guide 63 and extending parallel to the focal plane of the camera as the film unit is drawn into space 68 between rollers 64 and 65. That is to say, spring loaded member 69 possesses sufficient forward pressure to maintain the proper inclination of the film unit with respect to opening 36 and guide 63 as the unit is drawn between rollers 64 and 64, whereas resilient member 80 possesses somewhat lesser backward pressure which is sufficient to urge the superposed positive and negative elements of the film unit together for the purposes of this invention without significantly deflecting spring loaded member 69 and, of course, without rupturing the pod before it reaches the processing rollers. FIG. 4 shows how openings 53 and 54 in the back wall permit the free edge 70 of member 69 to be correctly positioned relative to the guide 63 and space 68.

After an operator has caused surface 14 to be exposed by operating a shutter mechanism (not shown), the film unit is withdrawn from the camera for processing external thereto in two distinct steps. For the first step, the operator grasps free end 67 of tab 18 and pulls in the direction of arrow 71 in FIG. 5. Web means interconnecting the positive and negative cooperates with pressure plate 33 to cause the longitudinal movement of the end of tab 18 releasably attached to portion 19 of the negative leader 16, to impart a simultaneous longitudinal movement to leader 16. Such movement pulls negative 11 180° around guide 51 until at least a portion of surface 14 on the negative faces surface 15 on the positive; causes portion 20 of leader 16 to extend through the space between the rollers and pass outwardly through opening 72 in the transverse end face of the camera adjacent opening 66; and causes portion 23 of positive leader 17 to fold under itself as shown best in FIG. 5 while positive 12 is held stationary by block 58 of positive holder 56. The compressive influence of resilient member 80 in cooperation with block 58 of positive holder 56 is, of course, insufficient to interfere with this folding process and as shown in FIG. 5, resilient member 80 is deflected somewhat to accommodate pod 24 without rupturing it. The longitudinal movement continues until the resistance to such movement is greater than the shear resistance of the releasable connection between tab 18 and portion 19. Thus, FIG. 5 shows the relative positions of the various elements of the film package just as the tab separates from the leader. It should be noted that exit 36 is of such size and so located as to allow longitudinal movement of portions 19 and 20 of leader 17, tab 18 prior to separation serving to guide portion 20 through bite 68. In fact, exit 36 is designed to effect longitudinal movement of the positive and the negative without impediment into and through the bite, which is the second step, the initial part of which is shown in FIG. 6. As such, the walls defining exit 36 do not sufficiently urge the negative and positive together as they pass therethrough.

Since portion 20 is external to the camera, the operator can now grasp such portion, pulling it in the direction of arrow 71. The negative, being directly connected to portion 20 by portion 19, moves with portion 20 to a position intermediate positive 12 and resilient member 80, and the initial longitudinal displacement of portion 20 causes portion 23, folded upon itself as shown in FIG. 5, to unfold completely as shown in FIG. 6 such that the negative 11 and positive 12 are moved into superposed face-to-face registration with leader portions 19 and 23 superposed. Simultaneously, pod 24 passes between rollers 64 and 65, is ruptured and releases processing liquid between the two superposed portions 19 and 23. At this point, the positive is directly connected to portion 20 by portion 23, and further displacement of portion 20 causes the two sheets to be drawn as a unit through space 68 between rollers 64 and 65 continuously spreading the processing liquid between the coatings 14 and 15 until the unit is removed from the film package and the camera as well. It can readily be seen from the FIGS. 5 and 6 how the positive and negative elements throughout this withdrawal process are urged into close relationship with one another by the compressive force provided by resilient member 80 in cooperation with block 58 of positive holder 56 in accordance with this invention.

It will be apparent to those skilled in the art that the conception upon which this disclosure is based may be readily utilized as a basis for designing structures other than that of the embodiment detailed above for carrying out the purpose of this invention. Therefore, since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic film pack adapted to be processed in a camera by a pair of juxtaposed pressure-applying members, said film pack comprising:

a generally flat oblong container having an exposure opening in the forward wall and an exit opening at one transverse end;

at least a negative sheet element having a photosensitive coating on one surface thereof, a positive sheet element having a non-photosensitive coating on one surface thereof and a rupturable pod retaining a liquid processing composition, said sheet elements being arranged in stacked relationship within said container, said coated surfaces in unregistered relationship facing toward said exposure opening and the leading edge of said positive sheet element adjacent said exit opening;

a pressure plate positioned between said sheet elements, one flat surface of said pressure plate in forward urging engagement with said negative sheet element to operatively associated said photosensitive coating with said exposure opening and the focal plane of said camera, and the opposite flat surface having thereon a resilient member in enggement with a leading portion of the coated surface of said positive sheet element;

web means interconnecting said sheet elements and cooperable with said pressure plate, including manually operable means adapted to move said negative sheet element after exposure thereof intermediate said positive sheet element and said resilient member to a position wherein said coated surfaces of said sheet elements are in superposed face-to-face registration, said resilient means urging a leading portion of said negative sheet element against said leading portion of said positive sheet element; and further adapted to subsequently move said superposed sheet elements longitudinally as a unit through said exit opening and between said pressure-applying processing members, said rupturable pod being positioned intermediate said sheet elements to effect unidirectional discharge of said processing liquid between and in contact with said superposed coated surfaces upon rupture of said pod by said processing members; and a positive holder mounted on the back wall of said container and including a block of frictional material forwardly urged into engagement with a leading portion of the back surface of said positive sheet element by apparatus in said camera;

said resilient member on said pressure plate adapted to cooperate with said block on said positive holder in applying light compressive force to said superposed registered sheet elements when said elements are withdrawn therebetween and through said exit opening into the bite of said processing members, said light compressive force being sufficient to urge said superposed registered elements together during said withdrawal.

2. A photographic film pack adapted to be processed in a camera by a pair of juxtaposed pressure-applying members, said film pack comprising:

a generally oblong container having an exposure opening in the forward wall and an exit opening at one transverse end;

at least a negative sheet element having a photosensitive coating on one surface thereof, a positive sheet element having a nonphotosensitive coating on one surface thereof and a rupturable pod retaining a liquid processing composition, said sheet elements being arranged in stacked relationship within said container, said coated surfaces in unregistered relationship facing toward said exposure opening and the leading edge of said positive sheet element adjacent said exit opening;

a pressure plate positioned between said sheet elements, one flat surface of said pressure plate in forward urging engagement with said negative sheet element to operatively associate a photosensitive coating with said exposure opening and the focal plane of said camera, and the opposite flat surface having thereon a resilient member in engagement with a leading portion of the coated surface of said positive sheet element;

web means interconnecting said sheet elements and cooperable with said pressure plate, including manually operable means adapted to move said negative sheet element after exposure thereof intermediate said positive sheet element and said resilient member to a position wherein said coated surfaces of said sheet elements are in superposed face-to-face registration with said resilient means urging a leading portion of said negative sheet element against said leading portion of said positive sheet element; and further adapted to subsequently move said superposed sheet elements longitudinally as a unit through said exit opening and between pressure-applying processing members, said rupturable pod being positioned to effect unidirectional discharge of said processing liquid between and in contact with said superposed coated surfaces upon rupture of said pod by said processing members; and a positive holder mounted on the back wall of said container and including a block of frictional material forwardly urged into engagement with a leading portion of the back surface of said positive sheet element by apparatus in a camera;

said resilient member on said pressure plate adapted to cooperate with said block on said positive holder in applying light compressive force to said superposed registred sheet elements when said elements are withdrawn therebetween and through said exit opening into the bite of said processing members, said light compressive force being sufficient to urge said superposed registered elements together during said withdrawal; wherein said resilient member is a generally wedge-shaped pad of plastic foam having a rectangular base section secured to said opposite flat surface of said pressure plate, and an upstanding end section adapted to engage said film unit.

3. In a photographic film pack having an exposure opening in the forward wall and an exit opening at one transverse end and containing at least one diffusion transfer film unit including a positive sheet element and a negative sheet element positioned within a container in unregistered stacked relationship for exposure of said negative sheet element, a pressure plate positioned between said negtive sheet and said positive sheet when said sheets are in said unregistered stacked position said negative sheet element carrying a rupturable pod retaining a light processing composition, and manually operable web means adapted to bring said negative sheet element into superposed face-to-face registration with said positive sheet element after said exposure and further adapted to effect subsequent withdrawal of said superposed registered sheet elements as a unit from said container for processing, the improvement which comprises:

resilient means for urging said superposed registered sheet elements together during the withdrawal of said film unit from said container and a positive holder mounted on the rear wall of said container and including a block of frictional material in forward urging engagement with the back surface of said positive sheet elements, said positive holder and said resilient means adapted to cooperate in applying light compressive force to said superposed registered sheet elements as said film unit is withdrawn therebetween and from said container.

4. A photographic film pack as defined in claim 3 wherein said resilient means comprises a pad of plastic foam mounted on the back surface of said pressure plate.

* * * * *